US006691307B2

(12) United States Patent
Long

(10) Patent No.: US 6,691,307 B2
(45) Date of Patent: Feb. 10, 2004

(54) INTERPRETER OPTIMIZATION FOR NATIVE ENDIANNESS

(75) Inventor: Dean R. E. Long, Boulder Creek, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/368,304

(22) Filed: Aug. 3, 1999

(65) Prior Publication Data

US 2003/0028866 A1 Feb. 6, 2003

(51) Int. Cl.⁷ .................................................. G06F 9/45
(52) U.S. Cl. ............................ 717/159; 717/143; 711/1
(58) Field of Search ............................ 717/9, 159, 143; 707/5; 709/100–108; 712/233–240, 300; 714/38; 711/1

(56) References Cited

U.S. PATENT DOCUMENTS

| | | | |
|---|---|---|---|
| 5,367,687 A | | 11/1994 | Tarsy et al. ..................... 717/9 |
| 5,398,328 A | * | 3/1995 | Weber et al. ................. 717/143 |
| 5,423,010 A | * | 6/1995 | Mizukami ..................... 341/60 |
| 5,446,482 A | * | 8/1995 | Van Aken et al. ........... 345/199 |
| 5,493,675 A | | 2/1996 | Faiman, Jr. et al. ............. 717/9 |
| 5,524,256 A | * | 6/1996 | Turkowski ................... 712/300 |
| 5,572,713 A | * | 11/1996 | Weber et al. ................. 703/27 |
| 5,574,923 A | * | 11/1996 | Heeb et al. .................... 712/38 |
| 5,627,975 A | * | 5/1997 | Bryant et al. ............... 710/127 |
| 5,630,084 A | * | 5/1997 | Ikumi ........................... 712/200 |
| 5,634,013 A | * | 5/1997 | Childers et al. ............. 710/100 |
| 5,640,545 A | * | 6/1997 | Baden et al. ................. 345/545 |
| 5,721,812 A | * | 2/1998 | Mochizuki ................... 712/300 |
| 5,778,233 A | | 7/1998 | Besaw et al. ................. 717/159 |
| 5,778,406 A | * | 7/1998 | Willard ........................... 711/1 |
| 5,781,763 A | * | 7/1998 | Beukema et al. ............. 710/22 |
| 5,819,117 A | * | 10/1998 | Hansen ......................... 712/300 |
| 5,828,853 A | * | 10/1998 | Regal ........................... 710/128 |
| 5,828,884 A | * | 10/1998 | Lee et al. ..................... 717/141 |
| 5,898,896 A | * | 4/1999 | Kaiser et al. .................. 710/65 |
| 5,905,895 A | | 5/1999 | Halter ............................ 717/9 |
| 5,913,064 A | | 6/1999 | Chen ............................. 717/2 |
| 5,937,170 A | * | 8/1999 | Bedirada ..................... 711/202 |
| 5,968,164 A | * | 10/1999 | Loen et al. ................... 712/204 |
| 6,279,126 B1 | * | 8/2001 | Malik et al. .................. 714/38 |

OTHER PUBLICATIONS

James, Multiplexed Buses: The Endian Wars Continue, 1990, IEEE, p. 9–21.*
Czajkowski, et al., "Jres: A Resource Accounting Interface for Java", Oct. 1998, Proceedings of the 1998 ACM OOPSLA Conference, Vancouver, BC.

* cited by examiner

Primary Examiner—John Chavis
(74) Attorney, Agent, or Firm—Thelen Reid & Priest LLP; John P. Schaub

(57) ABSTRACT

A method for interpreter optimization includes receiving multiple data units organized according to a first endian order, reordering the data units according to a second endian order and interpreting the reordered data units. According to one aspect, the data units include at least one opcode having at least one operand, each operand including at least one data unit. According to another aspect, a class loader reorders the code within a classfile from big-endian format to little-endian format.

36 Claims, 9 Drawing Sheets

```
ClassFile {                              20
    ...
    u2 methods_count;
    method_info methods [methods_count] ;
    ...
} method_info {
    ...                                  22
    u2 attributes_count;
    attribute_info
    attributes [attributes_count] ;
} attribute_info {                         24
    u2 attribute_name_index;
    u4 attribute_length;
    u1 info [attribute_length] ;
}

Code_attribute {                         26
    ...         28
    u4 code_length;
    u1 code [code_length] ;
    ...         30
}
```

FIG. 2

INTERPRETER OPTIMIZATION FOR NATIVE ENDIANNESS

BACKGROUND OF THE INVENTION

1. Field of the Invention

The present invention relates to computer systems. More particularly, the present invention relates interpreter optimization for native endianness.

2. Background

A known problem for software developers and computer users is the lack of portability of software across operating system platforms. As a response to this concern, the Java™ programming language was developed at Sun Microsystems as a platform independent, object oriented computer language.

Java™ achieves its operating system independence by being both a compiled and interpreted language. The way in which this independence is achieved is illustrated in FIG. 1. First, Java™ source code 10, which consists of Java™ classfiles, is compiled into a generic intermediate format called Java™ bytecode 14. Java™'s bytecodes consist of a sequence of single byte opcodes, each of which identify a particular operation to be carried out. Additionally, some of the opcodes have parameters. For example, opcode number 21, iload<varnum>, takes the single-word integer value stored in the local variable, varnum, and pushes it onto a stack.

Next, the bytecodes 14 are interpreted by a Java™ Virtual Machine (JVM) 16. The JVM executes the bytecodes, either by interpreting them or by compiling them to native machine code and then executing the compiled code. The JVM 16 is a stacked-based implementation of a "virtual" processor that shares many characteristics with physical microprocessors. The bytecodes 14 executed by the JVM 16 are essentially a machine instruction set, and as will be appreciated by those of ordinary skill in the art, are similar to the assembly language of a computing machine. Accordingly, every hardware platform or operating system may have a unique implementation of the JVM 16, called a Java™ Runtime System, to route the universal bytecode calls to the underlying native system 18.

Although Java™ provides portability through bytecodes, Java™ programs lag natively compiled programs, written in languages like C/C++, in their execution time. When a user activates a Java program on a Web Page, the user must wait not only for the program to download but also to be interpreted. To improve Java's execution time, optimizations can be introduced into the processing of Java™ bytecodes 14. These optimizations can be implemented in a variety of manners including as Stand-Alone Optimizers (SAOs) or as part of Just-in-Time (JIT) compilers.

A SAO transforms an input classfile containing bytecode 14 into an output classfile containing bytecodes that more efficiently perform the same operations. A JIT transforms an input classfile containing bytecode 14 into an executable program. Prior to the development of JITs, a JVM 16 would step through all the bytecode instructions in a program and mechanically perform the native code calls. With a JIT compiler, however, the JVM 16 first makes a call to the JIT which compiles the instructions into native code that is then run directly on the native operating system 18. The JIT compiler permits natively complied code to run faster and makes it so that the code only needs to be compiled once. Further, JIT compilers offer a stage at which the executable code can be optimized.

Optimizing the processing of Java™ bytecodes is complicated by the way in which different computers store data. The "endianness" of a computer CPU is determined by whether the least significant bit is in the lowest or highest addressed byte. In a little-endian computer, the low-order byte of a number is stored in memory at the lowest address, and the high-order byte at the highest address. In a big-endian computer, the high-order byte of a number is stored in memory at the lowest address, and the low-order byte at the highest address. Big-endian order is also known as network order. Table 1 illustrates the different byte ordering used by little-endian and big-endian computers.

TABLE 1

| Big-endian | | | |
|---|---|---|---|
| byte 0 | byte 1 | byte 2 | byte 3 |
| Little-endian | | | |
| byte 3 | byte 2 | byte 1 | byte 0 |

The different byte ordering means that little-endian and big-endian systems store multibyte quantities differently. For example, the 32-bit (four byte) quantity represented by the hex constant 0x11AABBCC is equivalent to the number 296,401,868. However, Table 2 shows the different ways little-endian and big-endian systems store the value 0x11AABBCC. The most significant (big) byte, 0x11, is stored first on the big-endian system and last on the little-endian system.

TABLE 2

| Big-endian | | | |
|---|---|---|---|
| 0x11 | 0xAA | 0xBB | 0xCC |
| Base Address+0 | Base Address+1 | Base Address+2 | Base Address+3 |
| Little-endian | | | |
| 0xCC | 0xBB | 0xAA | 0x11 |
| Base Address+0 | Base Address+1 | Base Address+2 | Base Address+3 |

Intel processors and DEC Alphas use little-endian byte order. IBM's 370 computers, most RISC-based computers and Motorola microprocessors use big-endian byte order.

Native and translated programs cannot share binary data without taking into account the big-endian vs. little-endian architectural differences. Otherwise, the same binary data residing on disk or in memory looks different to each type of program. Little-endian systems typically order bytes right to left, so the native program looks to the last byte for the most significant bit. Because a typical big-endian system orders bytes in the reverse direction, the translated program looks to the first byte for the most significant bit. For example, if a big-endian processor writes a file targeted to a little-endian processor, the byte order must be reversed. Similarly, if a little-endian processor reads a file that was targeted for a big-endian processor, the byte order must be reversed before the contents of the file are interpreted.

Furthermore, files containing varying length fields cannot be converted from one byte-ordering convention to another simply by swapping all the bytes. Some examples of files having varying length fields include program binary files and Java™ classfiles. To change byte ordering, programs are typically recompiled using the appropriate compiler option. However, Java™ classfiles must be in big-endian order. In this case, a Java™ interpreter running on a little-endian processor typically organizes code according to native endianness on the fly.

Increasing demands on computers in general create an incentive to optimize the speed and efficiency of program execution. The run time nature of Java™-like systems provides a significant additional incentive for such optimizations. Accordingly, a need exists in the prior art for a method for optimizing program execution.

BRIEF DESCRIPTION OF THE INVENTION

A method for interpreter optimization includes receiving multiple data units organized according to a first endian order, reordering the data units according to a second endian order and interpreting the reordered data units. According to one aspect, the data units include at least one opcode having at least one operand, each operand including at least one data unit. According to another aspect, a class loader reorders the code within a classfile from big-endian format to little-endian format.

BRIEF DESCRIPTION OF THE DRAWINGS

FIG. 2 is a block diagram that illustrates the Java™ classfile structure.

DETAILED DESCRIPTION OF THE PREFERRED EMBODIMENTS

Figure 1:
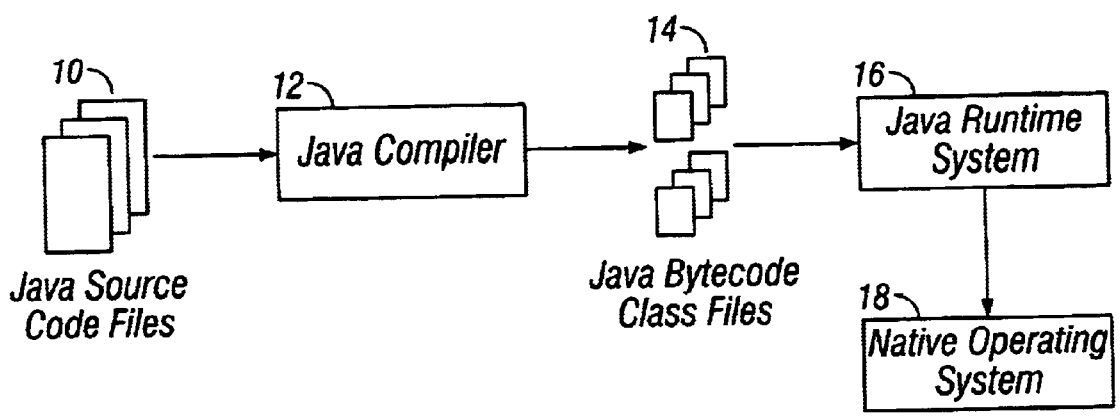
FIG. 1 is a block diagram that illustrates a typical Java™ system.

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to interpreter optimization for native endianness. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, a classfile organized according to a first endian order is rewritten according to a second endian order for subsequent interpretation. The present invention enables optimizations by allowing applications such as interpreters to interpret the code and other data in a classfile directly, rather than first converting the code and other data to another endian order before each use.

Although the interpreter optimization described herein is described with reference to Java™ bytecodes, the invention has a broader scope. The description of Java™ is done merely for illustrating possible applications of the present invention. Those of ordinary skill in the art will recognize that the invention could be applied to code and associated data of various languages, generated for any program to be executed on a computer.

An operand is the part of an instruction that references data to be acted upon. An operation code (opcode) is the part of an instruction that tells the computer what to do, such as input, add or branch. The opcode is the verb; the operands are the nouns. For example, in the instruction iadd value1 value2, value1 and value2 are the operands and iadd is the opcode.

TABLE 3

| default opcode = xB9 (185) |
|---|
| invokeinterface<br>indexbyte1<br>indexbyte2<br>count<br>0 |

TABLE 4

| default opcode = xB8 (184) |
|---|
| invokestatic<br>indexbyte1<br>indexbyte2 |

Table 3 illustrates the format of the Java™ invokeinterface instruction. The instruction has one opcode (invokeinterface), followed by four operands. Table 4 illustrates the format of the Java™ invokestatic instruction. The instruction has one opcode (invokestatic), followed by two operands.

Each Java™ classfile contains the definition of a single class or interface. A classfile consists of a stream of eight-bit bytes. The Java Virtual Machine Specification (Lindholm, et al., *The Java Virtual Machine Specification*, Addison-Wesley, 1999) defines its own set of data types representing classfile data. The types u1, u2 and u4 represent an unsigned one-, two- or four-byte quantity, respectively. All 16-bit, 32-bit and 64-bit quantities are constructed by reading in two, four and eight consecutive eight-bit bytes, respectively. Multibyte data items are always stored in big-endian order.

Turning now to FIG. 2, the Java™ classfile structure is illustrated. Parts of the structure pertinent to Java™ code are shown. A classfile consists of a single classfile structure 20. The JVM code for a method 22 is stored in the code array 30 of the Code attribute 26 of a method_info structure 22 of a classfile 20. For each instruction in the code array 30 except the last, the index of the opcode of the next instruction equals the index of the opcode of the current instruction plus the length of that instruction, including all its operands. The last byte of the last instruction in the code array 30 must be the byte at index code_length-1.

Thus, in order to read the bytecodes, one must decode the four bytes of the code length 28, and then read that many bytes. The bytecodes themselves are an array of bytes. Typically, a class loader does not decode the bytecodes. Rather, a class verifier or the interpreter typically examines the bytecodes. According to one embodiment of the present invention, an application such as a class loader rewrites the code array 30 in such a way that the operands are in the correct byte order before they are examined. The application does this by stepping through the bytecodes one at a time, with the knowledge of what type of operand each opcode takes.

Figure 3A:
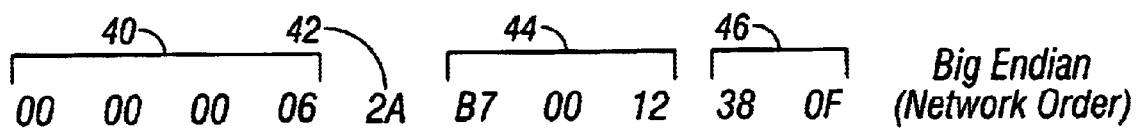
FIG. 3A is a block diagram that illustrates a Java™ code segment from a classfile.

FIG. 3A is a block diagram that illustrates a Java™ code segment from a classfile. The first four bytes 40 contain the code segment length, which is six. Bytecode 42 represents the aload_0 opcode, which has no operands. Bytecodes 44 represent the invoke_special opcode and two operands. Bytecodes 46 represent the fstore opcode and one operand.

Figure 3B:
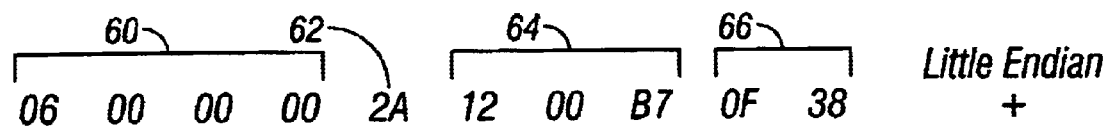
FIG. 3B is a block diagram that illustrates converting the code segment of FIG. 3A, to little-endian format in accordance with one embodiment of the present invention.

FIG. 3B is a block diagram that illustrates converting the code segment of FIG. 3A to little-endian format in accordance with one embodiment of the present invention. Reference numerals 40, 42, 44 and 46 of FIG. 3A correspond to reference numerals 60, 62, 64 and 66 of FIG. 3B, respectively. Note that the order of instructions in memory is the same for FIGS. 3A and 3B, but the bytes within each instruction have a different endian order. Note also that the length of the code segment is stored first and each operand is in little-endian order, making this method well suited for little-endian processors.

Figure 4:
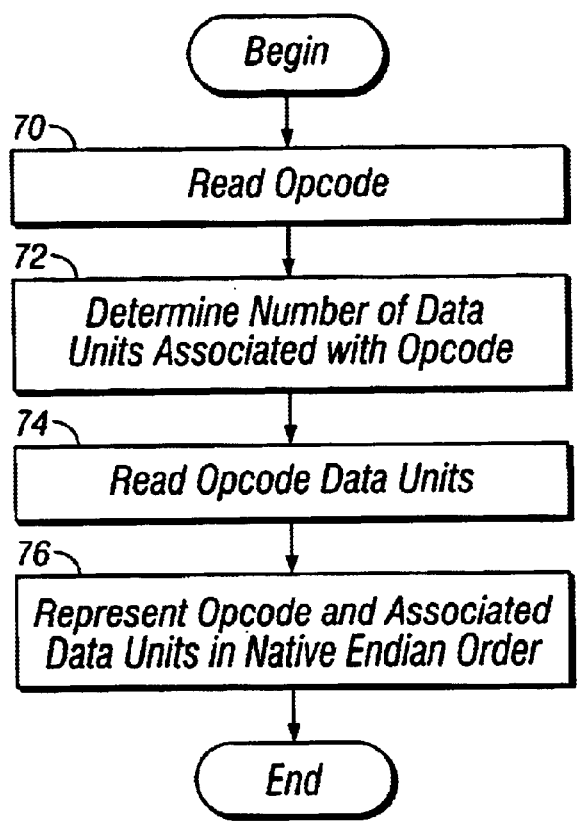
FIG. 4 is a flow diagram that illustrates reordering code in accordance with one embodiment of the present invention.

Turning now to FIG. 4, a method for reordering code in accordance with one embodiment of the present invention is presented. At reference numeral 70, an opcode is read. At reference numeral 72, the number of data units associated with the opcode is determined. A data unit may be the smallest individually addressable data unit. By way of example, a data unit may be an eight-bit byte, a sixteen-bit word, or a 32-bit word, depending upon the computer architecture. The number of data units associated with the opcode includes the sum of the number of data units associated with each operand of the opcode. At reference numeral 74, the data units associated with the opcode are read. At reference numeral 76, the opcode and associated data units are represented in native endian order.

According to one embodiment of the present invention, code organized according to big-endian order is reordered according to little-endian order. This embodiment is applicable, for example, to JVMs running on a computer having a little-endian architecture.

According to another embodiment of the present invention, code organized according to little-endian order is ordered according to big-endian order. This embodiment is applicable to applications running on a computer having a big-endian architecture and interpreting data which was written in little-endian order.

FIGS. 5A through 9B illustrate several ways for interpreter optimization for native endianness in accordance with the present invention. The figures and the accompanying description are provided for illustrative purposes only and are not intended to be limiting in any way. In some embodiments of the present invention described below, a runtime system loads and executes code that has been organized for native endianness. In other embodiments of the present invention, a runtime system loads code, organizes the code for native endianness and then executes the reorganized code. In each of these embodiments, code is organized for native endianness once at some point before a runtime system such as a JVM executes the code.

Figure 5A:
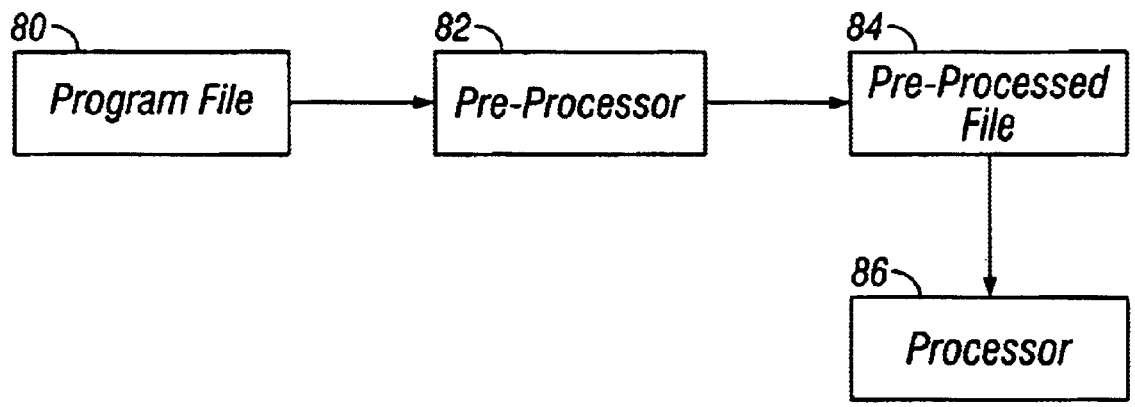
FIG. 5A is a block diagram that illustrates pre-loading program files in accordance with one embodiment of the present invention.

Turning now to FIG. 5A, a block diagram that illustrates pre-loading program files in accordance with one embodiment of the present invention is presented. At least one program file 80 is pre-processed by pre-processor 82. The program file 80 may be any file including opcodes. The pre-processor 82 organizes the code according to native endianness, and creates at least one pre-processed file 84. The pre-processed program file 84 is loaded and executed by a processor 86. Processor 86 may be, for example, an interpreter or a runtime system.

Figure 5B:
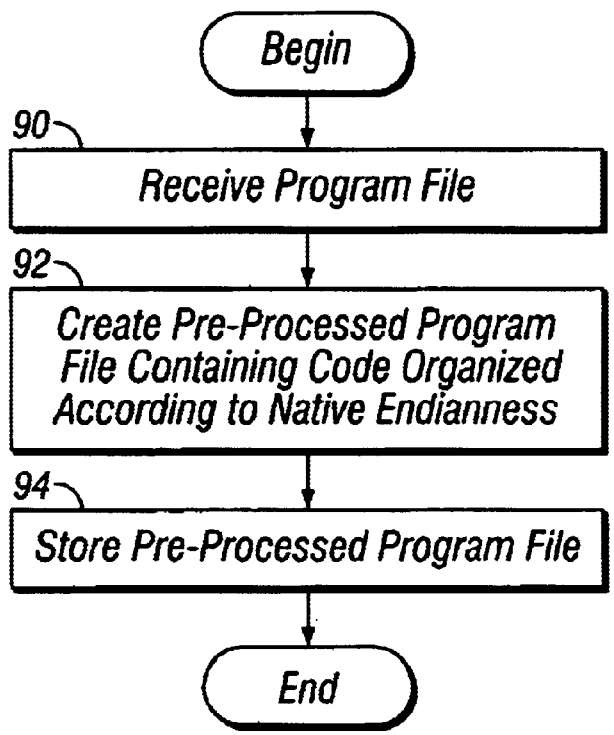
FIG. 5B is a flow diagram that illustrates pre-loading program files in accordance with one embodiment of the present invention.

Turning now to FIG. 5B, a method for pre-loading program files in accordance with one embodiment of the present is illustrated. At reference numeral 90, a program file is received. At reference numeral 92, the program file is processed to create a preprocessed file containing code that is organized according to native endianness. At reference numeral 94, the preprocessed program file is stored to a computer-readable medium.

Figure 6A:
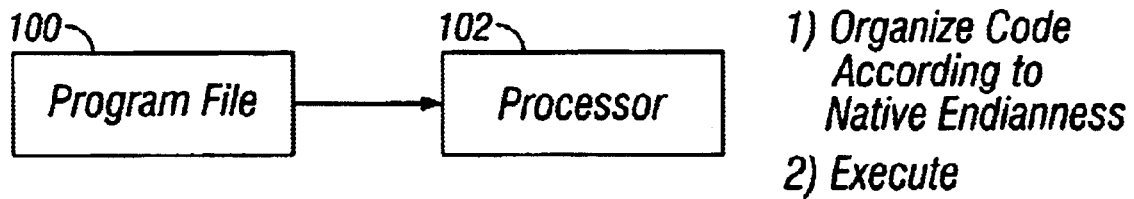
FIG. 6A is a block diagram that illustrates executing program files in accordance with one embodiment of the present invention.

Turning now to FIG. 6A, a block diagram that illustrates executing program files in accordance with one embodiment of the present invention is presented. A processor 102 loads a program file 100, organizes the code according to native endianness, and makes the modified program file available for execution. Processor 102 may be, for example, an interpreter or a runtime system.

Figure 6B:
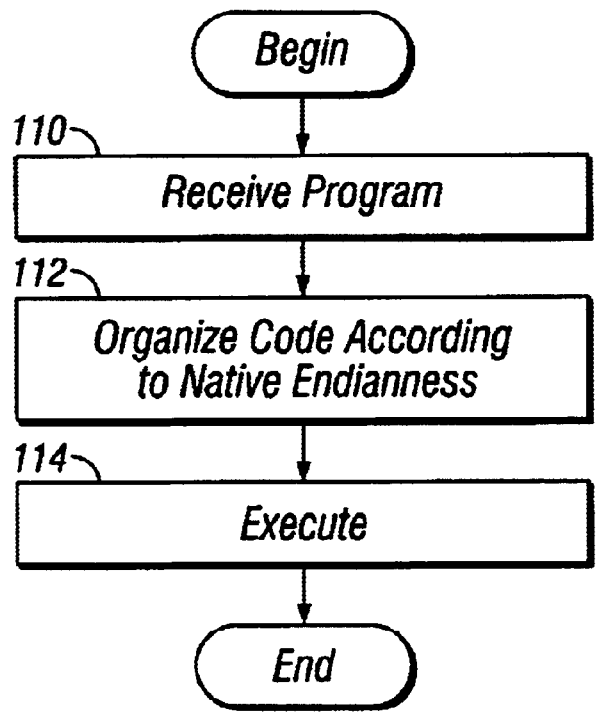
FIG. 6B is a flow diagram that illustrates executing program files in accordance with one embodiment of the present invention.

Turning now to FIG. 6B, a method for executing program files in accordance with one embodiment of the present is illustrated. At reference numeral 110, a program file is received. At reference numeral 112, code within the file is organized according to native endianness. At reference numeral 114, the program file is made available for execution.

Figure 7A:
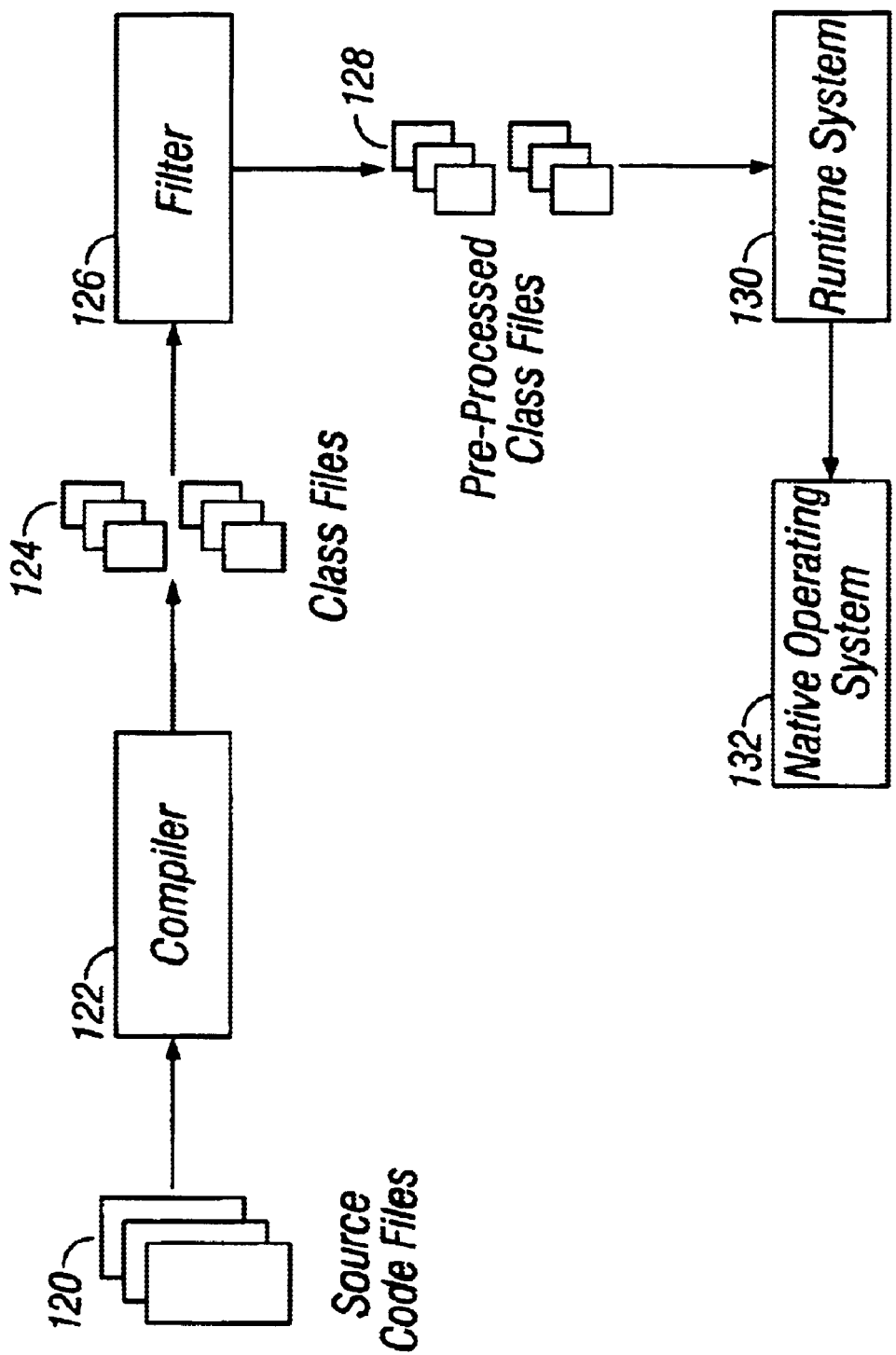
FIG. 7A is a block diagram that illustrates filtering Java™ classfiles in accordance with one embodiment of the present invention.

Turning now to FIG. 7A, a block diagram that illustrates filtering Java™ classfiles in accordance with one embodiment of the present invention is presented. Compiler 122 compiles at least one source code file 120. The compiler 122 creates at least one classfile 124. The filter 126 loads a classfile 124, organizes the classfile according to native endianness, and creates a preprocessed classfile 128. The preprocessed classfile 128 is read by the runtime system 130. The runtime system 130 makes calls to the native operating system 132.

Figure 7B:
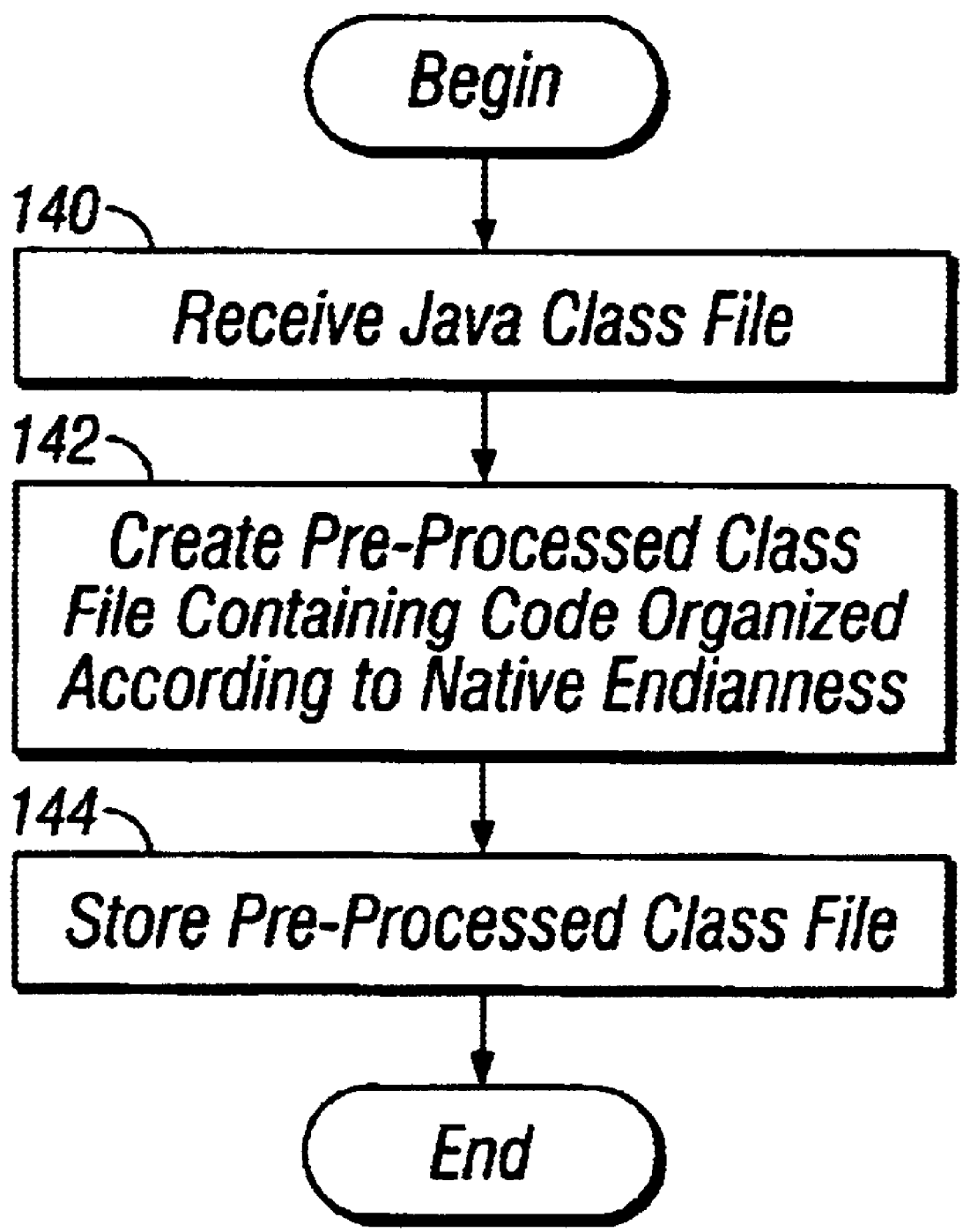
FIG. 7B is a flow diagram that illustrates filtering Java™ classfiles in accordance with one embodiment of the present invention.

Turning now to FIG. 7B, a method for filtering Java™ classfiles in accordance with one embodiment of the present is illustrated. At reference numeral 140, a Java™ classfile is received. At reference numeral 142, the classfile is filtered to create a preprocessed file containing code organized according to native endianness. At reference numeral 144, the preprocessed classfile is stored to a computer-readable medium.

Figure 8A:
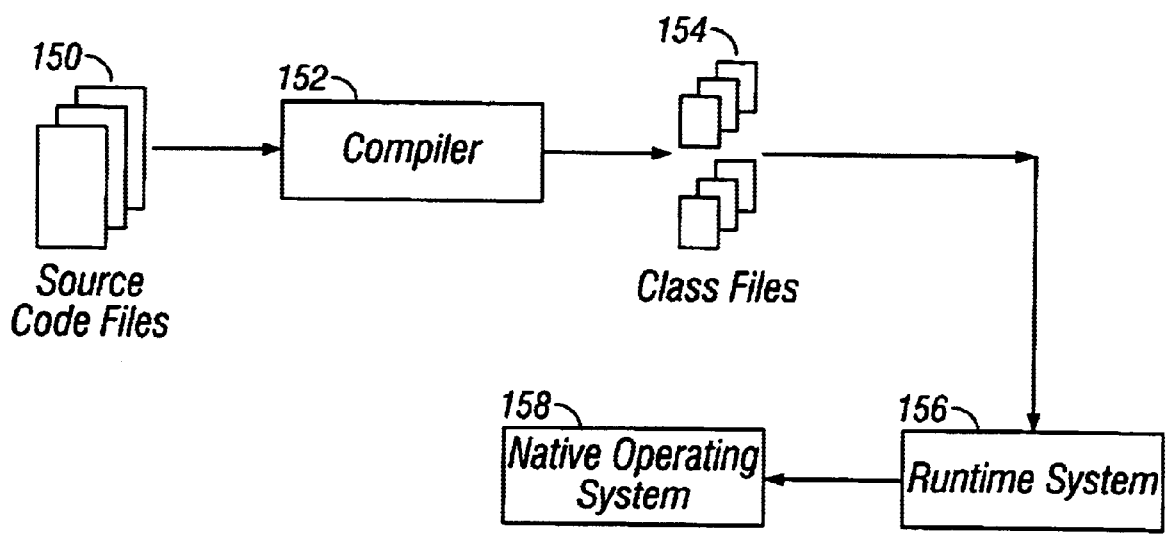
FIG. 8A is a block diagram that illustrates executing Java™ classfiles in accordance with one embodiment of the present invention.

Turning now to FIG. 8A, a block diagram that illustrates executing Java™ classfiles in accordance with one embodiment of the present invention is presented. Compiler 152 compiles at least one source code file 150. The compiler 152 creates at least one classfile 154. The runtime system 156 loads a classfile 154, organizes the code within the classfile according to native endianness, and makes the modified classfile available for execution. The runtime system 156 makes calls to the native operating system 158.

Figure 8B:
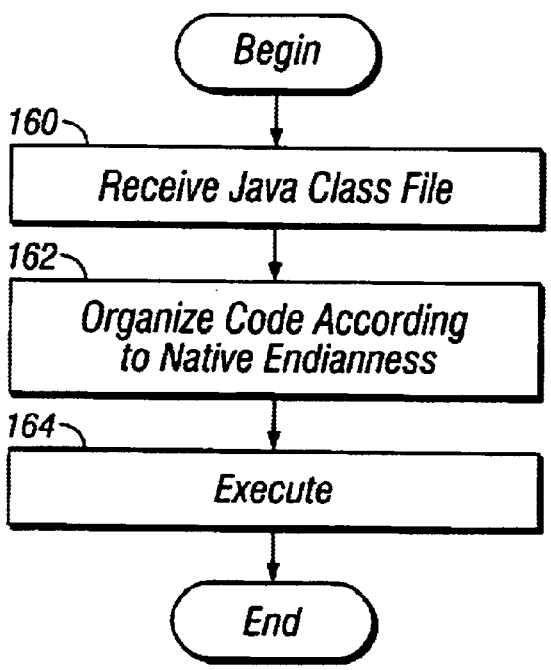
FIG. 8B is a flow diagram that illustrates executing Java™ classfiles in accordance with one embodiment of the present invention.

Turning now to FIG. 8B, a method for executing Java™ classfiles in accordance with one embodiment of the present is illustrated. At reference numeral 160, a Java™ classfile is received. At reference numeral 162, code within the classfile is organized according to native endianness. At reference numeral 164, the classfile made available for execution.

Figure 9A:
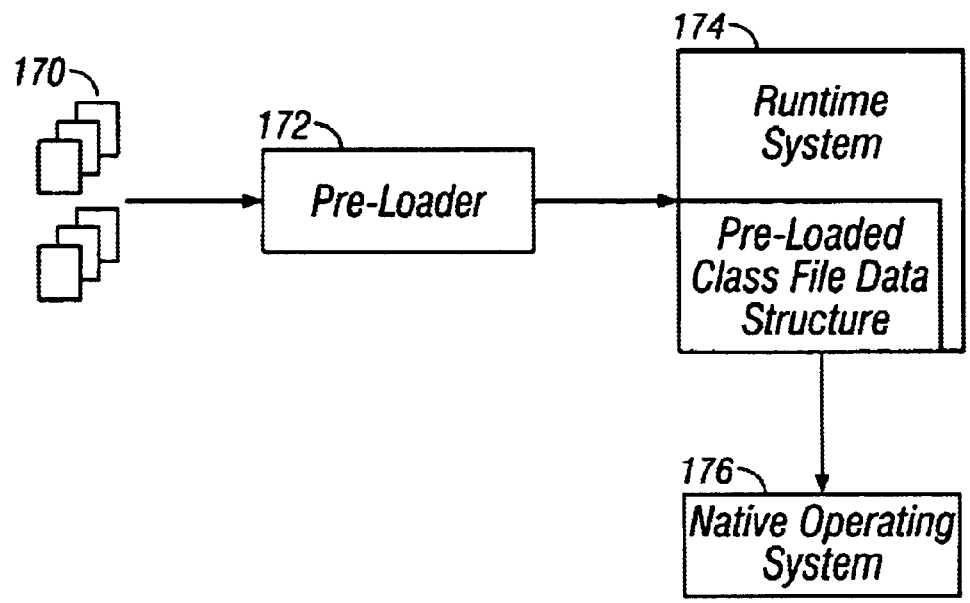
FIG. 9A is a block diagram that illustrates pre-loading Java™ classfiles in accordance with one embodiment of the present invention.

Turning now to FIG. 9A, a block diagram that illustrates pre-loading Java™ classfiles in accordance with one embodiment of the present invention is presented. The preloader 172 loads a classfile 170 and organizes code within the classfile according to native endianness. The preloader 172 outputs code and data structures for the runtime system 174. The output may be in the form of .c files or linkable object files. The .c files are compiled into object files and the object files are linked together into the runtime system 174 executable image either at build time or at runtime via dynamic linking. The runtime system 174 makes calls to the native operating system 176.

Figure 9B:
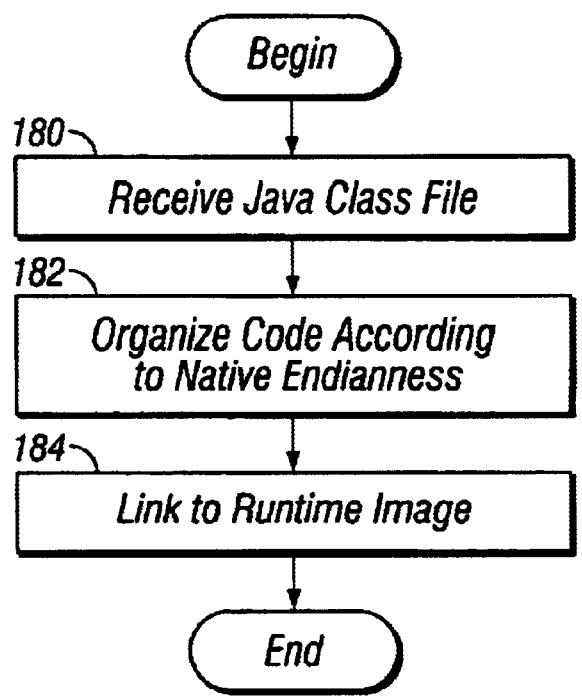
FIG. 9B is a flow diagram that illustrates pre-loading Java™ classfiles in accordance with one embodiment of the present invention.

Turning now to FIG. 9B, a method for pre-loading Java™ classfiles in accordance with one embodiment of the present is illustrated. At reference numeral 180, a Java™ classfile is received. At reference numeral 182, code within the classfile is organized according to native endianness. At reference numeral 184, code and data structures for the runtime system are output. The output may be in the form of .c files or linkable object files. The .c files are compiled into object files and object files are linked together into the runtime system 174 executable image either at build time or at runtime via dynamic linking.

The description of file formats read by a runtime system such as a JVM is not intended to be limiting in any way. Those of ordinary skill in the art will recognize that a JVM may read files other than classfiles or pre-processed classfiles. The JVM could read a file having any format that the JVM understands. For example, bytecodes could be converted to C data structures and then compiled into an object file. This object file could be linked into the runtime system. Alternatively, the runtime system could load the object file and runtime system using a form of dynamic linking. In accordance with the present invention, however, the code is organized for native endianness once at some point before a runtime system such as a JVM executes the code.

As has been described, the present invention provides interpreter optimization for native endianness. Although organizing code according to native endianness can be performed in parallel with the interpretation of the opcode, it is best to perform the code organization process first and then store the results for the subsequent interpretation process. Moreover, even though the organization of Java™ classfiles is described in the present disclosure, it is understood by those who are skilled in the art that code from other languages may be organized for native endianness by utilizing the same technique as disclosed. Further, even though eight-bit opcodes are used in the present disclosure for illustrating the invention, the same technique as described is also applicable to other opcodes of other sizes generated by a compilation of a high-level computer program.

According to a presently preferred embodiment, the present invention may be implemented in software or firmware, as well as in programmable gate array devices, Application Specific Integrated Circuits (ASICs), and other hardware.

Thus, a novel method for interpreter optimization for native endianness has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for interpreting a program, comprising:

receiving a first code array comprising a plurality of instructions, each instruction comprising an opcode followed by a predetermined number of operands, each operand including at least one data unit, said predetermined number based on said opcode, said first code array organized according to a first endian order;

reordering said first code array according to a second endian order to create a second code array, said reordering comprising:

determining a number of data units associated with at least one operand of said opcode; and representing said opcode and said at least one operand in said second endian order based at least in part on said determining; and interpreting said second code array.

2. The method of claim 1, wherein said reordering further comprises:

reading an opcode;

determining a number of data units associated with at least one operand of said opcode;

reading said number of data units; and representing said opcode and said at least one operand in said second endian order.

3. The method of claim 1 wherein said first code array is comprised by a Java™ classfile.

4. A method for interpreter optimization, the interpreter targeted to a processor having a first endian order, the method comprising:

receiving a first code array comprising a plurality of instructions, each instruction comprising an opcode followed by a predetermined number of operands, each operand including at least one data unit, said predetermined number based on said opcode, said first code array organized according to a first endian order;

reordering said first code array according to a second endian order to create a second code array, said reordering comprising:

determining a number of data units associated with at least one operand of said opcode; and representing said opcode and said at least one operand in said second endian order based at least in part on said determining; and storing said second code array, to a computer-readable medium.

5. The method of claim 4 wherein said first code array is comprised by a Java™ classfile.

6. A method for pre-processing a program file, the program file including a plurality of data units arranged according to a first endian order, the plurality of data units including at least one opcode having at least one operand, each operand including at least one data unit, the method comprising:

receiving the program file;

processing the program file to create at least one pre-processed program file, said at least one pre-processed program file including a first code array comprising a plurality of instructions, each instruction comprising an opcode followed by a predetermined number of operands, each operand including at least one data unit, said predetermined number based on said opcode, said first code array organized according to a first endian order, said processing including reordering said first code array according to a second endian order, said reordering comprising:

determining a number of data units associated with at least one operand of said opcode; and representing said opcode and said at least one operand in said second endian order based at least in part on said determining; and storing said at least one pre-processed program file on a computer-readable medium.

7. The method of claim 6, wherein said program file comprises a Java™ classfile.

8. A method for pre-processing a Java™ classfile on a little-endian computer, comprising:

receiving a Java™ classfile, said classfile including a first code array comprising a plurality of instructions, each instruction comprising an opcode followed by a predetermined number of operands, each operand including at least one data unit, said predetermined number based on said opcode, said first code array arranged according to big-endian order;

processing said Java™ classfile to create at least one pre-processed classfile, said processing including reordering said Java™ classfile according to little-endian order, said reordering comprising:

determining a number of data units associated with at least one operand of said opcode; and representing said opcode and said at least one operand in said little-endian order based at least in part on said determining; and storing said at least one pre-processed classfile on a computer-readable medium.

9. A method for executing Java™ classfiles on a computer having a little-endian architecture, the method comprising:

receiving a classfile, said classfile including a first code array comprising a plurality of instructions, each instruction comprising an opcode followed by a pre-determined number of operands, each operand including at least one data unit, said predetermined number based on said opcode, said first code array arranged according to big-endian order;

reordering said classfile according to little-endian order, said reordering comprising:

determining a number of data units associated with at least one operand of said opcode; and representing said opcode and said at least one operand in said little-endian order based at least in part on said determining; and executing said class file.

10. A program storage device readable by a machine, embodying a program of instructions executable by the machine to perform a method for interpreting a program, comprising:

receiving a first code array comprising a plurality of instructions, each instruction comprising an opcode followed by a predetermined number of operands, each operand including at least one data unit, said predetermined number based on said opcode, said first code array organized according to a first endian order;

reordering said first code array according to a second endian order to create a second code array, said reordering comprising:

determining a number of data units associated with at least one operand of said opcode; and representing said opcode and said at least one operand in said second endian order based at least in part on said determining; and interpreting said second code array.

11. A program storage device readable by a machine, embodying a program of instructions executable by the machine to perform a method for interpreter optimization, the interpreter targeted to a processor having a first endian order, the method comprising:

receiving a first code array comprising a plurality of instructions, each instruction comprising an opcode followed by a predetermined number of operands, each operand including at least one data unit, said predetermined number based on said opcode, said first code array organized according to a first endian order;

reordering said first code array according to a second endian order to create a second code array, said reordering comprising:

determining a number of data units associated with at least one operand of said opcode; and representing said opcode and said at least one operand in said second endian order based at least in part on said determining; and storing said second code array to a computer-readable medium.

12. A program storage device readable by a machine, embodying a program of instructions executable by the machine to perform a method for pre-processing a program file, the program file including a plurality of data units arranged according to a first endian order, the plurality of data units including at least one opcode having at least one operand, each operand including at least one data unit, the method comprising:

receiving the program file;

processing the program file to create at least one pre-processed program file, said at least one pre-processed program file including a first code array comprising a plurality of instructions, each instruction comprising an opcode followed by a predetermined number of operands, each operand including at least one data unit, said predetermined number based on said opcode, said first code array organized according to a first endian order, said processing including reordering said first code array according to a second endian order, said reordering comprising:

determining a number of data units associated with at least one operand of said opcode; and representing said opcode and said at least one operand in said second endian order based at least in part on said determining; and storing said at least one pre-processed program file on a computer-readable medium.

13. A program storage device readable by a machine, embodying a program of instructions executable by the machine to perform a method for pre-processing a Java™ classfile on a little-endian computer, comprising:

receiving a Java™ classfile, said classfile including a first code array comprising a plurality of instructions, each instruction comprising an opcode followed by a predetermined number of operands, each operand including at least one data unit, said predetermined number based on said opcode, said first code array arranged according to big-endian order;

processing said Java™ classfile to create at least one pre-processed classfile, said processing including reordering said Java™ classfile according to little-endian order, said reordering comprising:

determining a number of data units associated with at least one operand of said opcode; and representing said opcode and said at least one operand in said little-endian order based at least in part on said determining; and storing said at least one pre-processed classfile on a computer-readable medium.

14. A program storage device readable by a machine, embodying a program of instructions executable by the machine to perform a method for executing Java™ classfiles on a processor having a little-endian architecture, the method comprising:

receiving a classfile, said classfile including a first code array comprising a plurality of instructions, each instruction comprising an opcode followed by a predetermined number of operands, each operand including at least one data unit, said predetermined number based on said opcode, said first code array arranged according to big-endian order;

reordering said classfile according to little-endian order, said reordering comprising:

determining a number of data units associated with at least one operand of said opcode; and representing said opcode and said at least one operand in said little-endian order based at least in part on said determining; and executing said classfile.

15. An apparatus for interpreting a program, comprising:
at least one memory having program instructions; and
at least one processor configured to use the program instructions to:

receive a first code array comprising a plurality of instructions, each instruction comprising an opcode followed by a predetermined number of operands, each operand including at least one data unit, said predetermined number based on said opcode, said first code array organized according to a first endian order;

reorder said first code array according to a second endian order to create a second code array, said reordering comprising:

determining a number of data units associated with at least one operand of said opcode; and representing said opcode and said at least one operand in said second endian order based at least in part on said determining; and interpret said second code array.

16. An apparatus for interpreting a program, the apparatus targeted to a processor having a first endian order, the apparatus comprising:

at least one memory having program instructions; and
at least one processor configured to use the program instructions to:

receive a first code array comprising a plurality of instructions, each instruction comprising an opcode followed by a predetermined number of operands, each operand including at least one data unit, said predetermined number based on said opcode, said first code array organized according to a first endian order;

reorder said first code array according to a second endian order to create a second code array, said reordering comprising:

determining a number of data units associated with at least one operand of said opcode; and representing said opcode and said at least one operand in said second endian order based at least in part on said determining; and store said second code array to computer-readable medium.

17. An apparatus for pre-processing a program file, the program file including a plurality of data units arranged according to a first endian order, the plurality of data units including at least one opcode having at least one operand, each operand including at least one data unit, the apparatus comprising:

at least one memory having program instructions; and
at least one processor configured to use the program instructions to:

receive the program file;
process the program file to create at least one pre-processed program file, said at least one pre-processed program file including a first code array comprising a plurality of instructions, each instruction comprising an opcode followed by a predetermined number of operands, each operand including at least one data unit, said predetermined number based on said opcode, said first code array organized according to a first endian order, said processing including reordering said first code array according to a second endian order, said reordering comprising:

determining a number of data units associated with at least one operand of said opcode; and representing said opcode and said at least one operand in said second endian order based at least in part on said determining; and store said at least one pre-processed program file on a computer-readable medium.

18. An apparatus for pre-processing a Java™ classfile on a little-endian computer, comprising:

at least one memory having program instructions; and
at least one processor configured to use the program instructions to:

receive a Java™ classfile, said classfile including a first code array comprising a plurality of instructions, each instruction comprising an opcode followed by a predetermined number of operands, each operand including at least one data unit, said predetermined number based on said opcode, said first code array arranged according to big-endian order;

process said Java™ classfile to create at least one pre-processed classfile, said processing including reordering said Java™ classfile according to little-endian order, said reordering comprising:

determining a number of data units associated with at least one operand of said opcode; and representing said opcode and said at least one operand in said little-endian order based at least in part on said determining; and store said at least one pre-processed classfile on a computer-readable medium.

19. An apparatus for executing Java™ classfiles on a computer having a little-endian architecture, the apparatus comprising:
at least one memory having program instructions; and
at least one processor configured to use the program instructions to:
receive a classfile, said classfile including a first code array comprising a plurality of instructions, each instruction comprising an opcode followed by a predetermined number of operands, each operand including at least one data unit, said predetermined number based on said opcode, said first code array arranged according to big-endian order;
reorder said classfile according to little-endian order, said reordering comprising:
determining a number of data units associated with at least one operand of said opcode; and
representing said opcode and said at least one operand in said little-endian order based at least in part on said determining; and
execute said classfile.

20. An apparatus for interpreting a program, comprising:
means for receiving a first code array comprising a plurality of instructions, each instruction comprising an opcode followed by a predetermined number of operands, each operand including at least one data unit, said predetermined number based on said opcode, said first code array organized according to a first endian order;
means for reordering said first code array according to a second endian order to create a second code array, said reordering comprising:
means for determining a number of data units associated with at least one operand of said opcode; and
means for representing said opcode and said at least one operand in said second endian order based at least in part on said determining; and
means for interpreting said second code array.

21. The apparatus of claim 20 wherein said first code array is comprised by a Java™ classfile.

22. An apparatus for interpreter optimization, the interpreter targeted to a processor having a first endian order, The apparatus comprising:
means for receiving a first code array comprising a plurality of instructions, each instruction comprising an opcode followed by a predetermined number of operands, each operand including at least one data unit, said predetermined number based on said opcode, said first code array organized according to a first endian order;
means for reordering said first code array according to a second endian order to create a second code array, said reordering comprising:
means for determining a number of data units associated with at least one operand of said opcode; and
means for representing said opcode and said at least one operand in said second endian order based at least in part on said determining; and
means for storing said second code array to a computer-readable medium.

23. The apparatus of claim 22 said first code array is comprised by a Java™ classfile.

24. An apparatus for pre-processing a program file, the program file including a plurality of data units arranged according to a first endian order, the plurality of data units including at least one opcode having at least one operand, each operand including at least one data unit, the apparatus comprising:
means for receiving the program file;
means for processing the program file to create at least one pre-processed program file, said at least one pre-processed program file including a first code array comprising a plurality of instructions, each instruction comprising an opcode followed by a predetermined number of operands, each operand including at least one data unit, said predetermined number based on said opcode, said first code array organized according to a first endian order, said processing including reordering said first code array according to a second endian order, said reordering comprising:
means for determining a number of data units associated with at least one operand of said opcode; and
means for representing said opcode and said at least one operand in said second endian order based at least in part on said determining; and
means for storing said at least one pre-processed program file on a computer-readable medium.

25. The apparatus of claim 24, wherein said program file comprises a Java™ classfile.

26. An apparatus for pre-processing a Java™ classfile on a little-endian computer, comprising:
means for receiving a Java™ classfile, said classfile including a first code array comprising a plurality of instructions, each instruction comprising an opcode followed by a predetermined number of operands, each operand including at least one data unit, said predetermined number based on said opcode, said first code array arranged according to big-endian order;
means for processing said Java™ classfile to create at least one pre-processed classfile, said means for processing including means for reordering said Java™ classfile according to little-endian order, said means for reordering comprising:
means for determining a number of data units associated with at least one operand of said opcode; and
means for representing said opcode and said at least one operand in said little-endian order based at least in part on said determining; and
means for storing said at least one pre-processed classfile on a computer-readable medium.

27. An apparatus for executing Java™ classfiles on a computer having a little-endian architecture, The apparatus comprising:
means for receiving a classfile, said classfile including a first code array comprising a plurality of instructions, each instruction comprising an opcode followed by a predetermined number of operands, each operand including at least one data unit, said predetermined number based on said opcode, said first code array arranged according to big-endian order;
means for reordering said classfile according to little-endian order, said means for reordering comprising:
means for determining a number of data units associated with at least one operand of said opcode; and
means for representing said opcode and said at least one operand in said little-endian order based at least in part on said determining; and
means for executing said classfile.

28. A method for interpreting a program, comprising:
step for receiving a first code array comprising a plurality of instructions, each instruction comprising an opcode followed by a predetermined number of operands, each operand including at least one data unit, said predetermined number based on said opcode, said first code array organized according to a first endian order;

step for reordering said first code array according to a second endian order to create a second code array, said reordering comprising:

step for determining a number of data units associated with at least one operand of said opcode; and step for representing said opcode and said at least one operand in said second endian order based at least in part on said determining; and step for interpreting said second code array.

29. The method of claim 28, wherein said step for reordering further comprises:

step for reading an opcode;

step for determining a number of data units associated with the at least one operand of said opcode;

step for reading said number of data units; and step for representing said opcode and said at least one operand in said second endian order.

30. The method of claim 28 wherein said first code array is comprised by a Java™ classfile.

31. A method for interpreter optimization, the interpreter targeted to a processor having a first endian order, the method comprising:

step for receiving a first code array comprising a plurality of instructions, each instruction comprising an opcode followed by a predetermined number of operands, each operand including at least one data unit, said predetermined number based on said opcode, said first code array organized according to a first endian order;

step for reordering said first code array according to a second endian order to create a second code array, said step for reordering comprising:

step for determining a number of data units associated with at least one operand of said opcode; and step for representing said opcode and said at least one operand in said second endian order based at least in part on said determining; and step for storing said second code array to a computer-readable medium.

32. The method of claim 31 wherein said first code array is comprised by a Java™ classfile.

33. A method for pre-processing a program file, the program file including a plurality of data units arranged according to a first endian order, the plurality of data units including at least one opcode having at least one operand, each operand including at least one data unit, the method comprising:

step for receiving the program file;

step for processing the program file to create at least one pre-processed program file, said at least one pre-processed program file including a first code array comprising a plurality of instructions, each instruction comprising an opcode followed by a predetermined number of operands, each operand including at least one data unit, said predetermined number based on said opcode, said first code array organized according to a first endian order, said processing including reordering said first code array according to a second endian order, said reordering comprising:

step for determining a number of data units associated with at least one operand of said opcode; and step for representing said opcode and said at least one operand in said second endian order based at least in part on said determining; and step for storing said at least one pre-processed program file on a computer-readable medium.

34. The method of claim 33, wherein said program file comprises a Java™ classfile.

35. A method for pre-processing a Java™ classfile on a little-endian computer, comprising:

step for receiving a Java™ classfile, said classfile including a first code array comprising a plurality of instructions, each instruction comprising an opcode followed by a predetermined number of operands, each operand including at least one data unit, said predetermined number based on said opcode, said first code array arranged according to big-endian order;

step for processing said Java™ classfile to create at least one pre-processed classfile, said processing including reordering said Java™ classfile according to little-endian order, said step for reordering comprising:

step for determining a number of data units associated with at least one operand of said opcode; and step for representing said opcode and said at least one operand in said little-endian order based at least in part on said determining; and step for storing said at least one pre-processed classfile on a computer-readable medium.

36. A method for executing Java™ classfiles on a computer having a little-endian architecture, the method comprising:

step for receiving a classfile, said classfile including a first code array comprising a plurality of instructions, each instruction comprising an opcode followed by a predetermined number of operands, each operand including at least one data unit, said predetermined number based on said opcode, said first code array arranged according to big-endian order;

step for reordering said classfile according to little-endian order, said step for reordering comprising:

step for determining a number of data units associated with at least one operand of said opcode; and step for representing said opcode and said at least one operand in said little-endian order based at least in part on said determining; and step for executing said classfile.

* * * * *